(12) United States Patent
Botta et al.

(10) Patent No.: US 9,880,983 B2
(45) Date of Patent: Jan. 30, 2018

(54) METHODS AND SYSTEMS FOR UNIQUELY IDENTIFYING DIGITAL CONTENT FOR EDISCOVERY

(71) Applicant: X1 Discovery, Inc., Pasadena, CA (US)

(72) Inventors: Brent Botta, Livermore, CA (US); Nicklaus Torrecillas, Los Gatos, CA (US); Jacob Edward Sleigh, London (CA)

(73) Assignee: X1 Discovery, Inc., Pasadena, CA (US)

( * ) Notice: Subject to any disclaimer, the term of this patent is extended or adjusted under 35 U.S.C. 154(b) by 469 days.

(21) Appl. No.: 14/293,600

(22) Filed: Jun. 2, 2014

(65) Prior Publication Data

US 2014/0359411 A1    Dec. 4, 2014

Related U.S. Application Data

(60) Provisional application No. 61/831,090, filed on Jun. 4, 2013.

(51) Int. Cl.
*G06F 17/00* (2006.01)
*G06F 17/22* (2006.01)

(52) U.S. Cl.
CPC ................................ *G06F 17/2288* (2013.01)

(58) Field of Classification Search
CPC ........................ G06F 17/2211; G06F 17/2288
See application file for complete search history.

(56) References Cited

U.S. PATENT DOCUMENTS 5,111,398 A    5/1992   Nunberg et al.
5,202,982 A *  4/1993   Gramlich .......... G06F 17/30171
(Continued)

FOREIGN PATENT DOCUMENTS

JP    2007006122 A  *  1/2007
JP    2007257348 A  *  10/2007
(Continued)

OTHER PUBLICATIONS

"Lotus Magellan Explorer's Guide," © 1989 Lotus Development Corporation.
(Continued)

*Primary Examiner* — Scott Baderman
*Assistant Examiner* — Benjamin J Smith
(74) *Attorney, Agent, or Firm* — Knobbe, Martens, Olson & Bear LLP

(57) ABSTRACT

Systems and methods provide for the collection of content, such as webpage content, and for detection of changes in content. Files composing a document at a different time periods may be accessed and sets of hash values corresponding to files composing the document at the different periods may be calculated. A determination is made as to whether a file in the identified files at the different time periods is an HTML file, and if so an additional hash value corresponding to the HTML file is calculated. Aggregated hash values may be calculated based on hash values in the sets of hash values. A report may be generated reporting hash values for the document as it exists at the different time periods, including the hash values for the files composing the document, the additional hash values for respective HTML files, and the aggregated hash values. Changes in hash values may be indicated.

25 Claims, 12 Drawing Sheets

(56) References Cited

U.S. PATENT DOCUMENTS

| | | | |
|---|---|---|---|
| 5,303,361 A | 4/1994 | Colwell et al. |
| 5,659,732 A | 8/1997 | Kirsch |
| 5,671,426 A | 9/1997 | Armstrong, III |
| 5,692,173 A | 11/1997 | Chew |
| 5,704,060 A | 12/1997 | Del Monte |
| 5,717,923 A | 2/1998 | Dedrick |
| 5,721,897 A | 2/1998 | Rubinstein |
| 5,724,424 A | 3/1998 | Gifford |
| 5,724,521 A | 3/1998 | Dedrick |
| 5,724,524 A | 3/1998 | Hunt et al. |
| 5,748,954 A | 5/1998 | Mauldin |
| 5,752,238 A | 5/1998 | Dedrick |
| 5,754,938 A | 5/1998 | Herz et al. |
| 5,754,939 A | 5/1998 | Herz et al. |
| 5,768,521 A | 6/1998 | Dedrick |
| 5,778,361 A | 7/1998 | Nanjo et al. |
| 5,794,210 A | 8/1998 | Goldhaber et al. |
| 5,819,273 A | 10/1998 | Vora et al. |
| 5,826,241 A | 10/1998 | Stein et al. |
| 5,832,208 A | 11/1998 | Chen et al. |
| 5,835,087 A | 11/1998 | Herz et al. |
| 5,848,397 A | 12/1998 | Marsh et al. |
| 5,848,407 A | 12/1998 | Ishikawa et al. |
| 5,852,820 A | 12/1998 | Burrows |
| 5,855,008 A | 12/1998 | Goldhaber et al. |
| 5,864,845 A | 1/1999 | Voorhees et al. |
| 5,864,846 A | 1/1999 | Voorhees et al. |
| 5,903,882 A | 5/1999 | Asay et al. |
| 5,907,837 A | 5/1999 | Ferrel et al. |
| 5,918,014 A | 6/1999 | Robinson |
| 5,920,854 A | 7/1999 | Kirsch et al. |
| 5,920,859 A | 7/1999 | Li |
| 5,951,731 A | 9/1999 | Tsunetomo et al. |
| 6,006,225 A | 12/1999 | Bowman et al. |
| 6,029,195 A | 2/2000 | Herz |
| 6,035,325 A | 3/2000 | Potts |
| 6,070,158 A | 5/2000 | Kirsch |
| 6,073,133 A | 6/2000 | Chrabaszcz |
| 6,078,866 A | 6/2000 | Buck et al. |
| 6,085,193 A | 7/2000 | Malkin et al. |
| 6,112,172 A | 8/2000 | True et al. |
| 6,182,068 B1 | 1/2001 | Culliss |
| 6,216,122 B1 | 4/2001 | Elson |
| 6,269,361 B1 | 7/2001 | Davis et al. |
| 6,330,567 B1 | 12/2001 | Chao |
| 6,366,923 B1 | 4/2002 | Lenk et al. |
| 6,421,675 B1 | 7/2002 | Ryan et al. |
| 6,496,820 B1 | 12/2002 | Tada et al. |
| 6,513,028 B1 | 1/2003 | Lee |
| 6,564,213 B1 | 5/2003 | Ortega et al. |
| 6,606,304 B1 | 8/2003 | Grinter et al. |
| 6,615,237 B1 | 9/2003 | Kyne et al. |
| 6,638,314 B1* | 10/2003 | Meyerzon ......... G06F 17/30864 |
| | | 707/999.01 |
| 6,658,626 B1* | 12/2003 | Aiken ............... G06F 17/2211 |
| | | 707/E17.039 |
| 6,665,668 B1 | 12/2003 | Sugaya et al. |
| 6,700,591 B1 | 3/2004 | Sharpe |
| 6,704,747 B1 | 3/2004 | Fong |
| 6,711,565 B1 | 3/2004 | Subramaniam et al. |
| 6,751,603 B1 | 6/2004 | Bauer et al. |
| 6,757,713 B1 | 6/2004 | Ogilvie et al. |
| 6,826,594 B1 | 11/2004 | Pettersen |
| 6,847,959 B1 | 1/2005 | Arrouye et al. |
| 6,862,713 B1 | 3/2005 | Kraft et al. |
| 6,873,982 B1 | 3/2005 | Bates et al. |
| 6,904,450 B1 | 6/2005 | King et al. |
| 6,961,731 B2 | 11/2005 | Holbrook |
| 7,035,903 B1 | 4/2006 | Baldonado |
| 7,047,502 B2 | 5/2006 | Petropoulos et al. |
| 7,054,855 B2 | 5/2006 | Basso et al. |
| 7,069,497 B1* | 6/2006 | Desai ............... G06F 17/3089 |
| | | 707/E17.116 |
| 7,370,035 B2 | 5/2008 | Gross et al. |
| 7,424,510 B2 | 9/2008 | Gross et al. |
| 7,424,676 B1 | 9/2008 | Carlson |
| 7,496,559 B2 | 2/2009 | Gross et al. |
| 7,571,325 B1* | 8/2009 | Cooley ............... H04L 63/0281 |
| | | 713/181 |
| 7,590,707 B2* | 9/2009 | McCloy, III ........ H04L 63/0236 |
| | | 709/217 |
| 7,676,501 B2* | 3/2010 | Wilson .................... G06F 21/64 |
| | | 707/999.201 |
| 7,702,636 B1 | 4/2010 | Sholtis |
| 7,707,255 B2 | 4/2010 | Satterfield |
| 7,945,914 B2 | 5/2011 | Hasiuk et al. |
| 8,019,741 B2 | 9/2011 | Gross et al. |
| 8,086,953 B1* | 12/2011 | Gabber ............. G06F 17/30899 |
| | | 707/709 |
| 8,296,303 B2* | 10/2012 | Navas ............... G06F 17/30516 |
| | | 707/747 |
| 8,498,977 B2 | 7/2013 | Gross et al. |
| 8,527,516 B1* | 9/2013 | Spasojevic ........ G06F 17/30873 |
| | | 707/738 |
| 8,543,697 B2* | 9/2013 | Knowles ........... G06F 17/30902 |
| | | 709/225 |
| 8,694,473 B2* | 4/2014 | Wilson .................... G06F 21/64 |
| | | 707/687 |
| 8,725,682 B2* | 5/2014 | Young ............... G06F 17/30017 |
| | | 707/610 |
| 8,788,935 B1* | 7/2014 | Hirsch ................ G06F 17/2247 |
| | | 715/234 |
| 8,892,532 B2* | 11/2014 | Sogtrop ............. G06F 17/30011 |
| | | 707/661 |
| 9,384,207 B2* | 7/2016 | Provenzano ...... G06F 17/30162 |
| 2001/0027406 A1 | 10/2001 | Araki et al. |
| 2001/0027450 A1* | 10/2001 | Shinoda .................... G06F 21/64 |
| 2001/0029508 A1 | 10/2001 | Okada et al. |
| 2001/0039490 A1 | 11/2001 | Verbitsky et al. |
| 2002/0019679 A1 | 2/2002 | Okada et al. |
| 2002/0055981 A1 | 5/2002 | Spaey et al. |
| 2002/0078087 A1* | 6/2002 | Stone .................. H01L 27/1203 |
| | | 715/255 |
| 2002/0083178 A1* | 6/2002 | Brothers ................ G06F 21/10 |
| | | 709/226 |
| 2002/0087408 A1 | 7/2002 | Burnett |
| 2002/0111962 A1 | 8/2002 | Crucs |
| 2002/0165707 A1 | 11/2002 | Call |
| 2002/0169763 A1 | 11/2002 | Tada et al. |
| 2002/0178009 A1 | 11/2002 | Firman |
| 2002/0184317 A1 | 12/2002 | Thankachan |
| 2003/0014415 A1 | 1/2003 | Weiss et al. |
| 2003/0037321 A1 | 2/2003 | Bowen |
| 2003/0110296 A1* | 6/2003 | Kirsch ..................... H04L 29/06 |
| | | 709/246 |
| 2003/0120939 A1* | 6/2003 | Hughes ................. H04L 9/3247 |
| | | 713/191 |
| 2003/0130993 A1 | 7/2003 | Mendelevitch et al. |
| 2003/0171910 A1 | 9/2003 | Abir |
| 2003/0227489 A1 | 12/2003 | Arend et al. |
| 2003/0229898 A1 | 12/2003 | Babu et al. |
| 2003/0233419 A1 | 12/2003 | Beringer |
| 2004/0073443 A1 | 4/2004 | Gabrick et al. |
| 2004/0128285 A1* | 7/2004 | Green ............... G06F 17/30864 |
| 2004/0133564 A1 | 7/2004 | Gross et al. |
| 2004/0143564 A1 | 7/2004 | Gross et al. |
| 2004/0172389 A1 | 9/2004 | Galai et al. |
| 2004/0205514 A1* | 10/2004 | Sommerer ............. G06F 17/212 |
| | | 715/205 |
| 2004/0221295 A1* | 11/2004 | Kawai .................. G06Q 10/107 |
| | | 719/313 |
| 2004/0230891 A1* | 11/2004 | Pravetz ............... G06F 21/6218 |
| | | 715/229 |
| 2005/0041955 A1* | 2/2005 | Beuque ................. H04L 9/3236 |
| | | 386/248 |
| 2005/0114666 A1* | 5/2005 | Sudia ..................... H04L 9/3236 |
| | | 713/175 |
| 2005/0204191 A1* | 9/2005 | McNally ............ G06F 17/30073 |
| | | 714/15 |
| 2005/0223061 A1 | 10/2005 | Auerbach |
| 2005/0256846 A1 | 11/2005 | Zigmond et al. |

(56) References Cited

U.S. PATENT DOCUMENTS

| | | | |
|---|---|---|---|
| 2006/0036684 A1* | 2/2006 | Schwerk | G06Q 10/10 709/204 |
| 2006/0064394 A1* | 3/2006 | Dettinger | G06F 17/30728 |
| 2006/0095424 A1 | 5/2006 | Petropoulos et al. | |
| 2006/0168067 A1 | 7/2006 | Carlson et al. | |
| 2006/0195379 A1 | 8/2006 | Abecassis | |
| 2006/0195481 A1 | 8/2006 | Arrouye | |
| 2006/0224604 A1 | 10/2006 | Landsman | |
| 2007/0179985 A1* | 8/2007 | Knowles | G06F 17/30902 |
| 2007/0192423 A1 | 8/2007 | Karlson | |
| 2007/0226204 A1 | 9/2007 | Feldman | |
| 2007/0240035 A1* | 10/2007 | Sthanikam | G06F 17/2211 715/234 |
| 2008/0034073 A1* | 2/2008 | McCloy | H04L 63/0236 709/223 |
| 2008/0114761 A1 | 5/2008 | Gross et al. | |
| 2008/0133487 A1 | 6/2008 | Gross | |
| 2008/0141365 A1* | 6/2008 | Soegtrop | G06F 17/30011 726/21 |
| 2008/0147818 A1 | 6/2008 | Sabo | |
| 2008/0177799 A1* | 7/2008 | Wilson | G06F 21/64 |
| 2008/0208812 A1 | 8/2008 | Quoc | |
| 2008/0249977 A1* | 10/2008 | Tsunemi | G06F 17/2211 |
| 2009/0119268 A1* | 5/2009 | Bandaru | G06F 17/2745 705/7.12 |
| 2009/0320127 A1* | 12/2009 | Hong | H04N 1/00846 726/21 |
| 2009/0328218 A1* | 12/2009 | Tsurukawa | G06F 21/64 726/23 |
| 2010/0125584 A1* | 5/2010 | Navas | G06F 17/30516 707/747 |
| 2010/0169320 A1 | 7/2010 | Patnam | |
| 2011/0055177 A1 | 3/2011 | Chakra | |
| 2011/0126142 A1 | 5/2011 | Zhou | |
| 2011/0182422 A1* | 7/2011 | Anderson | G06F 21/64 380/30 |
| 2011/0252033 A1* | 10/2011 | Narang | G06F 17/30628 707/737 |
| 2012/0017178 A1 | 1/2012 | Mulloy | |
| 2012/0124012 A1* | 5/2012 | Provenzano | G06F 17/30162 707/692 |
| 2012/0197912 A1 | 8/2012 | Grigsby | |
| 2012/0293840 A1* | 11/2012 | Wilson | G06F 21/64 358/1.15 |
| 2012/0330887 A1* | 12/2012 | Young | G06F 17/30017 707/610 |
| 2013/0042083 A1* | 2/2013 | Mutalik | G06F 17/30162 711/162 |
| 2013/0166909 A1* | 6/2013 | Agrawal | H04L 63/123 713/168 |
| 2013/0218873 A1* | 8/2013 | Lassley | G06F 17/30554 707/722 |
| 2013/0232160 A1* | 9/2013 | Tibble | G06F 17/2211 707/758 |
| 2013/0318053 A1* | 11/2013 | Provenzano | G06F 17/30162 707/692 |
| 2013/0326333 A1* | 12/2013 | Hashmi | G06F 17/2247 715/234 |
| 2013/0346327 A1* | 12/2013 | Lassley | G06Q 30/018 705/317 |
| 2014/0310324 A1 | 10/2014 | Branton | |
| 2014/0344249 A1 | 11/2014 | Magistrado | |
| 2015/0161159 A1* | 6/2015 | Provenzano | G06F 17/30162 707/692 |
| 2015/0188945 A1* | 7/2015 | Kjeldaas | H04L 63/20 726/1 |
| 2015/0278764 A1 | 10/2015 | Patil | |
| 2015/0293985 A1* | 10/2015 | Young | G06F 17/30017 707/610 |

FOREIGN PATENT DOCUMENTS

| | | | |
|---|---|---|---|
| WO | WO 9847264 A1 * | 10/1998 | H04L 9/3236 |
| WO | WO 99/01802 | 1/1999 | |
| WO | WO 99/39286 | 8/1999 | |
| WO | WO 99/48028 | 9/1999 | |
| WO | WO 00/16218 | 3/2000 | |
| WO | WO 00/41090 | 7/2000 | |
| WO | WO 00/67159 | 11/2000 | |
| WO | WO 2004/023243 A2 | 3/2004 | |

OTHER PUBLICATIONS

"Lotus Magellan Product Information Guide," Circa 1989.
Carol Ellison, "Info to Go," Jun. 30, 2002; printed from http://www.pcmag.com/article2/0, 1759,3575,00.asp.
Chapter 14, Section 14.5; "JavaScript & DHTML Cookbook" by Danny Goodman; ISBN: 0-596-00467-2; Publisher: O'Reilly; Print Publication Date Apr. 1, 2003.
Chris Sherman, "Enfish Tracker Pro," © Jan. 1999; printed from http://www.onlinemag.net/OL1999/sherman1.html.
Computing Service, Email Addresses in Microsoft Outlook 98, Dec. 5, 2000, pp. 1-3.
http://www2.essex.ac.uk/cs/services/email/addressing2.html—searched on www.waybackmachine.com—Internet Archive Wayback Machine.
International Search Report for PCT/US2003/027241, filed Sep. 3, 2003.
Inverted index, Wikipedia, http://en.wikipedia.org/wiki/Inverted_index; Dec. 12, 2006.
Jon Halpin, PC Data Finder Goes A-Hunting: Jun. 19, 2001; printed from http://www.pcmag.com/article2/0, 4149,144228,00.asp.
Pogue, David, *Finding Files and Web Sites with Sherlock 2*, MAC OS 9: The Missing Manual, Chapter 15, pp. 257-278, Mar. 30, 2000.
Proximity search (text), Wikipedia, http://en.wikipedia.org/wiki/Proximity_search_%28text%29; Dec. 12, 2006.
Shneiderman, B., et al., *Clarifying Search: A User-Interface Framework for Test Searches*, D-Lib Magazine, Jan. 1997.
Steve Barth, "Personal Toolkit: Navigating Information and Ideas," KMWorld Apr. 2003, vol. 12, Issue 4; printed from http://www.kmworld.com/publications/magazIne/index.cfm?actIon=readarticle&article id=1505&publication id=1.
Stop words, Wikipedia, http://en.wikipedia.org/wiki/Stop_words; Dec. 12, 2006.
Supplementary Search Report for EP 03794539.1, filed Sep. 3, 2003.

\* cited by examiner

- MD5 hash          • Ingestion                    • URL

[X] 2BA605AEBE8F43C122B53693B3FAADD1    6/3/2013 11:46 PM http://www.x1.com/
[X] 993F1B54B376969F7984A43218F7F57B    6/3/2013 11:46 PM http://www.x1.com/terms/website_privacy.html
[X] 813EADA06BB54C6107A96FCEF530EE35    6/3/2013 11:46 PM http://www.x1.com/terms/submission.html
[X] 40008BEE14F93E25B5BAB9D548AAA9E3    6/3/2013 11:46 PM http://www.x1.com/support/x1_submit_case.html
[X] D91C3C67BFD05541EEE5A4A145B8A0FB    6/3/2013 11:46 PM http://www.x1.com/support/log_in/change_email_address.html ◆ Tags    ● Metadata    ⬇ Export Record

| Acquisition Hash | Content Hash | Path |
|---|---|---|
| 44FDA54456103EBEDDC89BB6006C22BE | 28A284E588D7E8D67E56377557204B85 | x1\{x1_page_uid}_.html |
| 8F1D59433AC0D46B1626064E56273077 | 8F1D59433AC0D46B1626064E56273077 | x1\{x1_page_uid}_files\bkgd_bottom.gif |
| 97CE570182D1641B0E92E7AD94A73A79 | 97CE570182D1641B0E92E7AD94A73A79 | x1\{x1_page_uid}_files\bkgd_main.gif |
| 18F5A8E04D37637CC96AA0961FBEBSF5 | 18F5A8E04D37637CC96AA0961FBEBSF5 | x1\{x1_page_uid}_files\favicon-1.ico |
| 62019C058DE0530D6166A27AFFDBECE2 | 62019C058DE0530D6166A27AFFDBECE2 | x1\{x1_page_uid}_files\hr_dot.gif |
| 9CB30B3D3B1955E5E7DACEA94BE9ACF2 | 9CB30B3D3B1955E5E7DACEA94BE9ACF2 | x1\{x1_page_uid}_files\jquer.lightbox_0.5.css |

FIG. 2

X1 Import Mulitple URLs ✕

You can type a list of URLs in the text area below. Please ensure that you have only one URL per line of text. Optionally, you can import a list of URLs from a file by clicking the "Import List" button.

http://www.x1.com
http://www.x1discovery.com
http://blog.x1discovery.com

Collection Identifier: X1 Website

Collection Identifier: X1 Homepage, X1 Discovery Hompage, X1 Discovery blog

IMPORT LIST   OK   CANCEL

FIG. 3E

[X1] Web Crawler                                                                                        ×

You can configure your web crawler option on this screen. These settings cannot be changed for this collection after they are set.

START URL http://www.x1.com/

[✓] Max Number of Layers [5]    [ ] Max Number of Pages [0]

START URL

The URL filter allows user to collect only URLs that start with or contain the specified text Crawl pages where the page address: ( ) starts with:   (●) contains:

product                                    [ ] Include subdomains

START URL

Page download timeout: [120] seconds
[✓] Generate .PNG image of all webpages
[✓] Download videos for YouTube.com links
[✓] Download File URLs
    You can set the maximum allowable file size to download below. The white list allows you to select what file extensions to download.
Max File Size: [10] MB   [ ] Use White List   [SPECIFY FILE TYPES]

[OPEN LOG]  [OK]  [CANCEL]

METHODS AND SYSTEMS FOR UNIQUELY IDENTIFYING DIGITAL CONTENT FOR EDISCOVERY

CROSS-REFERENCE TO RELATED APPLICATIONS

Any and all applications for which a foreign or domestic priority claim is identified in the Application Data Sheet as filed with the present application, are hereby incorporated by reference in their entirety under 37 CFR 1.57.

BACKGROUND OF THE INVENTION

Field of the Invention

The present invention is related to detecting and identifying the alteration of digital content.

Description of the Related Art

Often, a party involved in litigation or subject to government regulation, is required to disclose information, such as electronically stored information (ESI), including for example, emails, electronic word processing documents, and video files, and audio files, to the other party involved in the litigation or to a government agency. At certain points in time, such information may be placed under a legal hold. When a legal hold is in place, the party holding the information may be prohibited from modifying, deleting or destroying the information. Conventional eDiscovery systems aid in determining when static electronic information has been altered, such as documents that are effectively static and that only change when the document is intentionally modified. However, conventional eDiscovery systems have not adequately addressed the challenges posed by dynamic digital documents that include links to other digital content, wherein if the linked to content changes that dynamic digital document changes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Example embodiments of methods and systems for uniquely identifying digital content, and for detecting changes in digital content, are described. The techniques disclosed herein may be used for a wide array of applications, such as electronic discovery (sometimes referred to as eDiscovery), content monitoring, quality assurance and verification, by way of example.

In an example embodiment, files composing a document at a different time periods may be accessed and sets of hash values corresponding to files composing the document at the different periods may be calculated. A determination may be made as to whether a file in the identified files at the different time periods is an HTML file, and if so an additional hash value corresponding to the HTML file is calculated. Aggregated hash values may be calculated based on hash values in the sets of hash values. A report may be generated reporting hash values for the document as it exists at the different time periods, including the hash values for the files composing the document, the additional hash values for respective HTML files, and the aggregated hash values. Changes in hash values may be indicated to indicate a change is the document and/or in a file composing the document.

An example embodiment provides a method of enabling changes in website content to be detected, the method comprising: receiving an address; accessing at a first time period, by a computerized system comprising at least one computing device, a web page corresponding to the address; identifying, by the system, HTML web page text of the web page accessed at the first time period; identifying, by the system, content linked to by the web page accessed at the first time period; storing the identified HTML web page text accessed at the first time period; accessing and storing the content linked to by the web page accessed at the first time period; calculating a first hash value for a first set of binary data of the web page accessed at the first time period by the system, the first set of binary data corresponding to the HTML web page text and the content linked to by the web page accessed at the first time period; calculating, by the system, a second hash value corresponding to the identified HTML web page text accessed at the first time period, wherein the second hash value is not calculated using the content linked to by the web page accessed at the first time period; storing the first hash value and the second hash value in association with a date and time corresponding to the first time period and in association with a first identifier; accessing, at a second time period, the web page corresponding to the address; identifying, by the system, HTML web page text of the web page accessed at the second time period; identifying, by the system, content linked to by the web page accessed at the second time period; storing the identified HTML web page text accessed at the second time period; accessing and storing the content linked to by the web page accessed at the second time period; calculating, by the system, a third hash value for a second set of binary data of the web page accessed at the second time period, the second set of binary data corresponding to the HTML web page text and the content linked to by the web page accessed at the second time period; calculating, by the system, a fourth hash value corresponding to the identified HTML web page text accessed at the second time period; storing the third hash value and the fourth hash value in association with a date and time corresponding to the second time period; using the first, second, third, and fourth hash values, generating, by the system, an indication as to whether the web page, including the content linked to by the web page, accessed at the second time period, has changed relative to the web page, including the content linked to by the web page, accessed at the first time period.

An example embodiment provides a method comprising: receiving an address for a document; identifying, by a computer system comprising at least one computing device, files composing the document at a first time period; calculating, by the computer system, a first set of hash values including respective hash values corresponding to the respective accessed files composing the document at the first time period; determining, by the computer system, if a file in the identified files composing the document at the first time period is an HTML file; at least partly in response to determining that a file in the identified files composing the document at the first time period is an HTML file, calculating, by the computer system, a first additional hash value corresponding to the HTML file; calculating, by the computer system, a first aggregated hash value based on hash values in the first set of hash values; identifying, by the computer system, files composing the document at a second time period; calculating, by the computer system, a second set of hash values including respective hash values corresponding to the respective accessed files composing the document at the second time period; determining, by the computer system, if a file in the identified files composing the document at the second time period is an HTML file; at least partly in response to determining that a file in the identified files composing the document at the second time period is an HTML file, calculating, by the computer system, a second additional hash value corresponding to the HTML file; calculating, by the computer system, a second aggregated hash value based on hash values in the second set of hash values; reporting: the first set of hash values, the first additional hash value, the first aggregate hash value, and the second set of hash values, the second additional hash value, and the second aggregate hash value.

An example embodiment provides a system comprising: a computing system comprising at least one computing device; a non-transitory computer storage medium having stored thereon executable instructions that direct the computing system to perform operations comprising: receiving an address for a document; identifying files composing the document at a first time period; calculating, by the computer system, a first set of hash values including respective hash values corresponding to the respective accessed files composing the document at the first time period; determining, by the computer system, if a file in the identified files composing the document at the first time period is an HTML file; at least partly in response to determining that a file in the identified files composing the document at the first time period is an HTML file, calculating, by the computer system, a first additional hash value corresponding to the HTML file; calculating, by the computer system, a first aggregated hash value based on hash values in the first set of hash values; identifying, by the computer system, files composing the document at a second time period; calculating, by the computer system, a second set of hash values including respective hash values corresponding to the respective accessed files composing the document at the second time period; determining, by the computer system, if a file in the identified files composing the document at the second time period is an HTML file; at least partly in response to determining that a file in the identified files composing the document at the second time period is an HTML file, calculating, by the computer system, a second additional hash value corresponding to the HTML file; calculating, by the computer system, a second aggregated hash value based on hash values in the second set of hash values; reporting: the first set of hash values, the first additional hash value, the first aggregate hash value, and the second set of hash values, the second additional hash value, and the second aggregate hash value.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 2, 3A, 3B, 3C, 3D, 3E, 4, 5A, 5B, and 5C illustrate example user interfaces.

DETAILED DESCRIPTION

Figure 1:
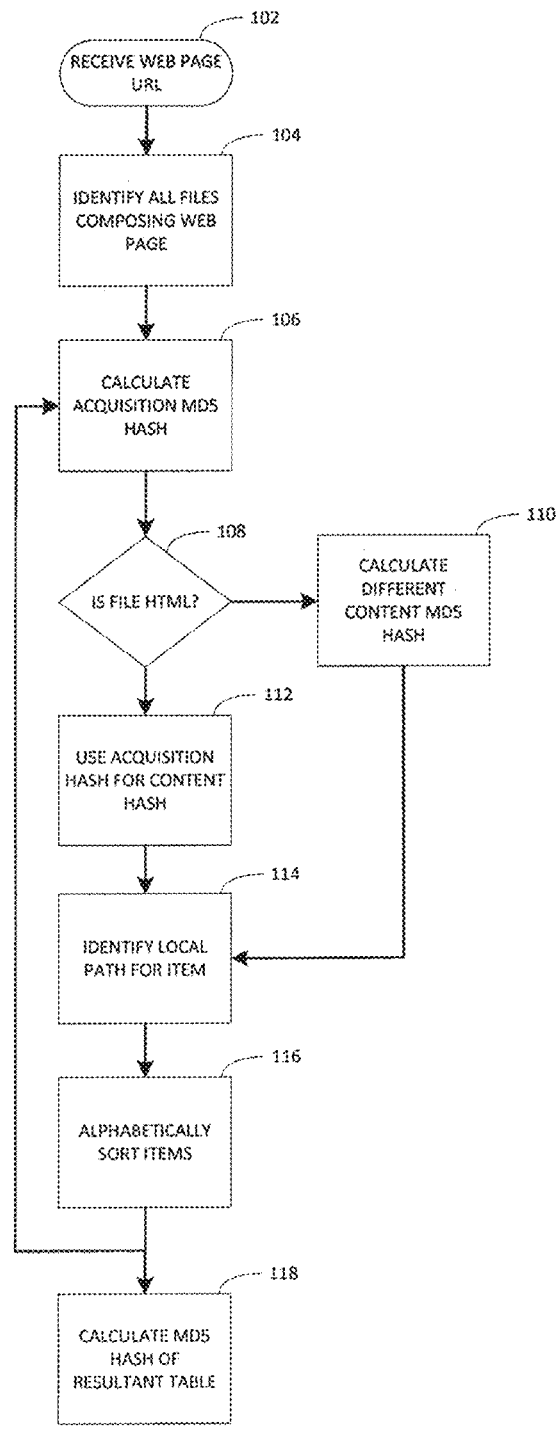
FIG. 1 illustrates an example architecture.

Example embodiments of methods and systems for uniquely identifying digital content, and for detecting changes in digital content, are described. Examples of digital content include, but are not limited to, digital content that include links to other content. The techniques disclosed herein may be used for a wide array of applications, such as electronic discovery (sometimes referred to as eDiscovery), content monitoring, quality assurance and verification, by way of example. It is understood that while certain examples may be discussed with respect to eDiscovery as applied to web pages, embodiments disclosed herein may be used for applications and other types of content, such as email, phone applications, etc.

By way of example, certain embodiments uniquely identify web pages that have been collected for the process of electronic discovery, compliance actions, forensic analysis, quality assurance, content monitoring or any other purpose, including those related to determining if web pages have been changed or altered. A given unique identifier for a web page may be generated, where the unique identifier may correspond to some or all of the web page content, optionally including web page metadata and documents linked to (e.g., using hyperlinks, such as a hyperlink that points to a whole document or to a specific element within a document.) by the web page (e.g., other web pages, image files, word processing, XML data feeds, etc.). Unique identifiers may be generated for a given web page at different points in time. A change in the web page content will result in a different identifier being generated for the web page. Conversely, if there is no change in the content of a web page, then the web page identifiers, generated for different snapshots of the web page, at different points in time, will have the same value.

Comparing an identifier generated for a given web page at one point (e.g., at the beginning of a legal hold period or other monitoring period) in time with identifiers generated for the web page at other points in time enables the determination as whether the content of the web page (optionally including linked-to content and metadata) has changed over the intervening time, and optionally the degree of change.

By way of example, a web page identifier may be generated by a content authentication system (sometimes referred to herein as a content analysis system) optionally using a hash function, a mathematical algorithm that maps data of variable lengths to a fixed length string of characters. The web page identifier may be significantly smaller in size than the web page. For example, the web page identifier may be a 32 digit long hexadecimal number, a 64 digit long hexadecimal number, or other size. Example hash functions include MD5, SHA-1, SHA-2, and SHA-3. By way of illustration, a file can be considered to be a very long binary number that can be fed into a hash algorithm to return an effectively unique hash. If the content of the file is changed, the binary number that it represents will necessarily be changed and therefore a new hash will be computed by the hash algorithm.

As noted above, conventional eDiscovery systems determining when static electronic information has been altered, such as documents that are effectively static and that only change when the document is intentionally modified. For example, conventional eDiscovery systems may use the MD5 hash algorithm for a static word processing document or email communication. By way of further example, for example conventional techniques define a set number of fields needed to uniquely identify an email, and then concatenate those fields and the body of the email into one continuous stream of data and then pass that data to the MD5 hash algorithm.

For both files and emails, the data to be analyzed is effectively static and only changes when the item is intentionally modified. This is generally not true for web pages. The standard web page is built up with Hyper Text Markup Language (HTML). This HTML code is rendered by the user's web browser and the format of the HTML used to construct the web page has sections that, once rendered, will be visible to the user and sections, such as internal hidden data, that will never be displayed to the user during normal viewing of the web page. An example a non-displayed section is metadata tags defined in the head section of the HTML code for a web page. While changes in the visible sections may be visible to a user, changes in the non-displayed (e.g., non-viewable) data may not be. Nonetheless, the detection of changes to both the visible and non-visible content may be needed for certain applications.

As noted above, non-displayed data can be changed in the HTML code for the web page that results in no visible change apparent to the user. In addition, HTML is designed to support embedded data and linked data. Such embedded data and linked data may be retrieved from the same web server serving the rest of the web page content or the embedded data and linked data may be loaded from a server on the other side of the world. For example, in HTML a hyperlink may be identified with an anchor, using a tag that starts with the text "<a", and includes a reference "href="URL">". By way of further example, XML may use an XLINK has a hyperlink.

A simple and inaccurate technique to identify web pages is to just calculate an MD5 hash using the text that represents the web page URL, such as by way of example "http://www.x1.com/products/x1_social_discovery/case_law_2012.HTML". While this hash identifies the page being captured, it does not capture any of the content of the web page. It is very possible and perhaps likely that the above URL would not change and therefore the hash of the URL at different points in time would provide the same MD5 hash value, but the content the user sees when navigating to the above URL could change dramatically over the course of a given time period.

Conventional eDiscovery systems treat web pages as static content, and simply use the text content of the page that is generated by the user's web browser as the data used to calculate the MD5 hash. A user can see this same text by opening a web page and then instruct the web browser to display the HTML source code (e.g., by activating a "View Source" control) to view the web page HTML source. This approach takes into consideration the main HTML code's content, but will only adequately work for the simplest of web pages that solely consist of static text and do not have any linking or embedded content, and so do not use external data.

In reality, the majority of all web pages contain linked or embedded content. The above described method would be unable to detect any changes to any of this external data. For example, consider a web page with static text and a link to an image named "campfire.jpg". The first time the web page is collected, conventional technologies would use the HTML text to create an MD5 hash. In this example, at some later point, the linked image "campfire.jpg" is replaced with a completely different image with the same name, "campfire.jpg". The next time the web page is collected, an MD5 hash calculated solely on the text content of the page would be identical to the first captured value, even though the page is now visibly different from the first time of collection. Thus, disadvantageously, even though the web page displayed to the user would change to include the new image, an operator viewing the hash for the now-changed web page would believe that the web page has not changed.

To illustrate another disadvantage of conventional technologies, referring to the previous example, if instead of changing the linked image, the web page author had changed the metadata of the HTML, the newly calculated MD5 hash would be different from the originally calculated MD5 hash value, even though nothing readily visible to the end user had changed. Thus, conventional technologies will often provide misleading results when determining whether or not a web page has changed.

To account for these issues, proper collection of a web page should not only uniquely identify the web page, it should include all linked or embedded content (or a desired specified subset thereof), and optionally it should also give an indication, where possible, of whether the changes made were to the visible portion of the web page or to hidden portions of the web page. It may also be desirable in certain instances to indicate whether the changes are made to the web page text, or to the linked-to content/embedded content (or to both). It may also be desirable in certain instances to indicate which linked-to or embedded content changed. It may also be desirable in certain instances to be compatible with current industry standards by providing a single MD5 hash value that can be used as the overall identifier of the data being collected. Certain embodiments may include one or more of the foregoing features.

An example embodiment includes a Content Authentication (CA) system, that operates on the user's computer (e.g., a desktop, laptop, tablet, smart phone, or other computer) connected to a local and/or wide area network (e.g., the Internet) and uses a network adapter to collect each portion of web pages specified by an operator (e.g., by providing the URLs for the web pages, or a for the website). The CA system, comprising a computing device, may calculate a hash (e.g., an MD5 hash) for each web page item (e.g., the HTML text, the linked-to content, the embedded content, the URLs, etc.), an additional content hash (which is a hash of the normally viewable content) that is different for HTML files, and combines each hash (or hashes for specified content types) into a single hash (e.g., a single MD5 hash) to be used as the overall web page identifier. The various hashes and optionally the data used to generate the hashes (e.g., the web page items) is stored locally on the user's computer (e.g., in non-volatile memory) for future use and review. Optionally, in addition or instead, the CA system may be hosted on a remote server (e.g., a cloud based system) and the hashes and other web page data may be stored locally or on the remote server or other storage device. Thus, the collection, computation, and storage of information may be performed in whole or in part by a local system or by a remote system.

As noted above, the collection of web pages and the calculations of identifiers may be performed as part of a legal or regulatory hold, or to be alerted when a change in content in a specified document (e.g., an online document, such as a web page) has been detected. By way of illustration, if a person has made an insurance claim for an accident, alleging that the accident prevented the person from working, an insurance company may wish monitor the person's social networking or blog web page to detect if the person has posted information which would indicate that the person's allegation is false, and that the person is physically capable of working. For example, the person may be posting information and/or images (e.g., still or video images) regarding the person's participating in a sport or other physically strenuous activity. The insurance company can specify to the CA system that the CA system should periodically (e.g., once a day, once a week, or other specified period or specific days) inspect the web page (e.g., by specifying the web page or domain to the CA system), determine if a change in the content has occurred, and generate an alert to an operator so that the operator can visually inspect the content to determine whether the change in content is relevant to the determination that the person is being truthful or untruthful. The CA system may then collect presentations of the specified web page at the specified timing, generate corresponding hashes, compare a given hash to one or more previously generated hashes (e.g., the last generated hash), determine if the hash value has changed, and if the hash value has changed, provide a change notification to a specified operator or system. The insurance company may specify that an alert should be generated when any change is detected, or only when change is detected with respect to viewable data. For example, the insurance company may not care if a URL to an image has changed if the new URL is still pointing to the same image (even if the image is now being accessed from a different source).

In certain cases, a given webpage may not have a beginning tag or an end-of-file tag. Instead, the webpage may be "endless". To deal with this and other cases, certain embodiments enable a user to indicate that the CA system is to look for posts or other changes after a user-specified date or after the last hash generation date, and run a hash on content after that posting date or last hash generation date. This enables the CA system to generate an artificial "end-of-file" to make a portion of the webpage into a "file." Optionally, certain embodiments enable the user to specify that comments from non-owners of a webpage (e.g., such as friends of a person posting comments on a social networking webpage of the person) are to be excluded from the hash generated for the webpage.

By way of further example, if a legal or regulatory hold has been placed on a set of documents, in response (e.g., as soon as possible after the legal hold has initiated or in response to a regulatory trigger) copies of the documents may be collected, and unique document identifiers (reflective of the document content, including embedded data and/or link-to content) may be generated in response using embodiments discussed herein for the documents as baseline identifiers. A user interface may be provided for presentation on a user computer via which an operator or other user can specify the location(s) (e.g., web page URL, a domain name, a file path, etc.) of the documents and when identifiers for the documents should be recalculated (e.g., periodically and/or substantially immediately in response to an operator instruction). The CA system may then generate an alert or provide other indication when a change in content has been detected.

Further, certain embodiments are configured to capture websites or files which are linked to remote systems with an HTML overlay. The CA system may generate an alert or provide other indications when a change in content has been detected in such websites or filed linked to remote systems.

As noted above, a user interface is provided via which a user can specify a URL of a web page to be collected and indexed. Optionally, the user interface includes a control via which the user indicate that the URL is of a starting web page, and that the CA system is to crawl the website from the starting web page to a specified depth or number of pages. For example, a web page may include a link to another web page, which may in turn include a link to yet another web page, and so on. There may be circumstances where a user only needs to detect if any changes have been made to only a first number of web pages in the linked chain of web pages.

FIG. 1 illustrates an example implementation, though other architectures and methodologies can be used in other embodiments. The user identifies a web page URL or domain 102 to collect (e.g., via a target field provided via a user interface) and the identification is received and stored by the CA system. The CA system identifies items (e.g., files) 104 associated with this web page (e.g., all files associated with the specified web page, all file types specified by the user (e.g., via a whitelist or otherwise), or all files associated with the specified web page except those file types that are to be excluded in accordance with a user specification (e.g., via a blacklist or otherwise)) and copies the items to system memory. For example, the files 104 may include linked and embedded data, as well as HTML web page text. For each collected file 104, the CA system calculates an MD5 (or other) hash 106 on the binary data of the file. If the file 104 is an HMTL file 108, in this example the CA system calculates an additional MD5 hash 110 for the HTML code. In this example, this additional MD5 hash 110 is calculated by the CA system using just the data between the <body> and </body> tag for the HTML file. In this example, for other files the system utilizes the same acquisition MD5 hash value 106 for the content MD5 hash value 112. The CA system determines and stores the local path 114 for the item (e.g., the tail end of the folder path of the copy of the item saved on the end user's computer system).

It may or may not be desirable to capture and include in the file hash the original URL of a file when identifying the path 114 to use in this process. Counterintuitively, it may be better in certain circumstances to exclude the URL as part of the unique identifier to the web page. It is not uncommon for different URLs to point at the same content, so by the URL from the web page hash, the user can identify web pages associated with seemingly different URLs as being identical. For example, URLs starting with http://x1.com, http://www.x1.com, and http://www.x1discovery.com might all point to the same final document/web page.

Once states 106 through 114 have been completed for each identified file that composes the desired web page, the CA system may generate a data structure, such as a table, including the acquisition MD5 hash 106, the content MD5 hash 110 or 112, and the path 114. Other data, such as the date the web page was collected, may also be included. The system may optionally sort the table alphabetically 116 using the path 114 as the sort order. This may ensure that the table data is consistently formatted and can therefore be compared against a previous list of the files (or the selected file types) that compose the web page. For example, if one or more linked or embedded files are added to or deleted from the web page, the table 116 for the changed web page would be different than the originally created table 116 for the original web page.

In this example, the CA system uses the data from table 116 as the input for calculating the overall hash 118 (sometimes referred to herein as an aggregated hash) for the collected web page.

FIG. 2 illustrates an example reporting user interface which is configured to display information generated and/or stored by the CA system. The CA system populates the report to include the URL 202 for the collected web page and the overall hash 204 for that web page. The CA system may also populate the report to include the table created for all the files (or the selected file types) that compose the web page, including the calculated acquisition hash 206, content hash 208, and the local path 210.

When the CA system combines each individual hash 206, 208, 210 into an overall hash 204 for the web page, the user can be assured that the web page has not changed if the system is still calculating the same overall hash 204 on subsequent collections. The system may provide a corresponding indication when there is, or when there is not, a match. For example, the system may emphasize hashes that do not match via color coding, an icon, or otherwise. In addition or instead, a corresponding notification may be transmitted (e.g., as an email, SMS message, or otherwise) to an operator or another system. Because the system may calculate the acquisition hash 206 separately for each item of the web page (or each item type specified by the user), the user can identify changes where only one of the linked items has changed. If the web page is identical except for a single image file, for example "campfire.jpg", the user can use the table of values 206, 208, and 210 and/or other notifications provided by the CA system to identify if that individual file has changed and be assured that that is the only change to the collected web page.

In embodiments where the CA system calculates the content hash 208 separately for HTML items, the user can identify when the acquisition hash 206 has changed but the content hash is the same, allowing the user to more quickly pinpoint the location of the change. It is not uncommon for the <metadata> tags in a web page to be changed frequently and therefore with the approach of only one MD5 hash for the full web page, this MD5 hash would be constantly changing, without giving the user an indication of which file or portion of the file was changing.

Optionally, the reporting user interface includes links to the corresponding document or document item. For example, if the user selects the acquisition hash or the URL, the CA system may cause the web page corresponding to the acquisition hash to be displayed and optionally the reference, earlier version of the web page (e.g., the initial version collected). Optionally, the CA system may modify the presentation of the accessed web page to emphasize the visible portions of the web page that have been changed relative to the reference web page (or vice versa). For example, if both versions of the web page include a link to an image, but the CA system has determined that the image has changed in the latter version of the reference web page, the CA system may visually and/or textually indicate that the image has changed (e.g., by drawing a red border around the image or otherwise).

Optionally, the CA system may be configured to detect different types of image changes. For example, optionally the system may be configured to detect whether the entire image has changed, whether the resolution/pixel count has changed, whether the image color has changed, whether the image has been cropped, or otherwise, using an image analysis module.

Certain example user interfaces will now be described with reference to the figures. Certain of the figures may be used to specify and initiate various types of content collection techniques, such as those using a single page web capture, a web crawler to capture multiple layers of a website, or the bulk import of multiple network resources (e.g., content associated with specified URLs).

Figure 3A:
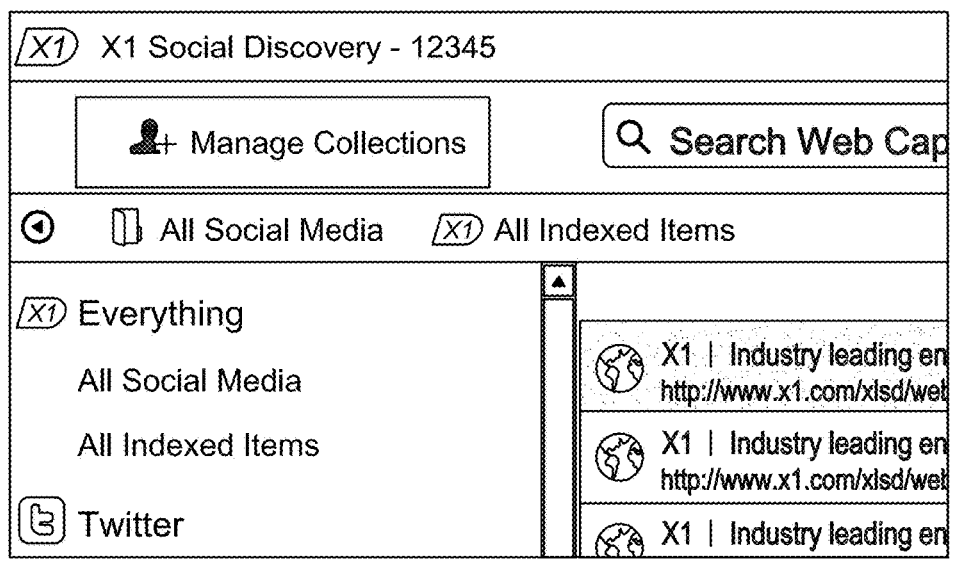

FIG. 3A illustrates an example discovery user interface provided by the CA system or a related application providing interfaces via which the user can select one or more sets of indexed media (e.g., social media, such as social networking web pages, microblogs, etc.) and via which the user can enter search queries to search such indexed social media. The discovery user interface may provide a "manage collections" control, which when activated by the user, may cause the example user interface illustrated in FIG. 3B to be presented. The example user interface illustrated in FIG. 3B lists available collections from various sources, such as microblog sites, image posting sites, social networking sites, and email sites, as well as a web capture control. If the user activates the web capture control, the example user interface illustrated in FIG. 3C may be presented, including a field via which the user can enter a name for the new bulk import collection (e.g., "new web collection").

Figure 3B:
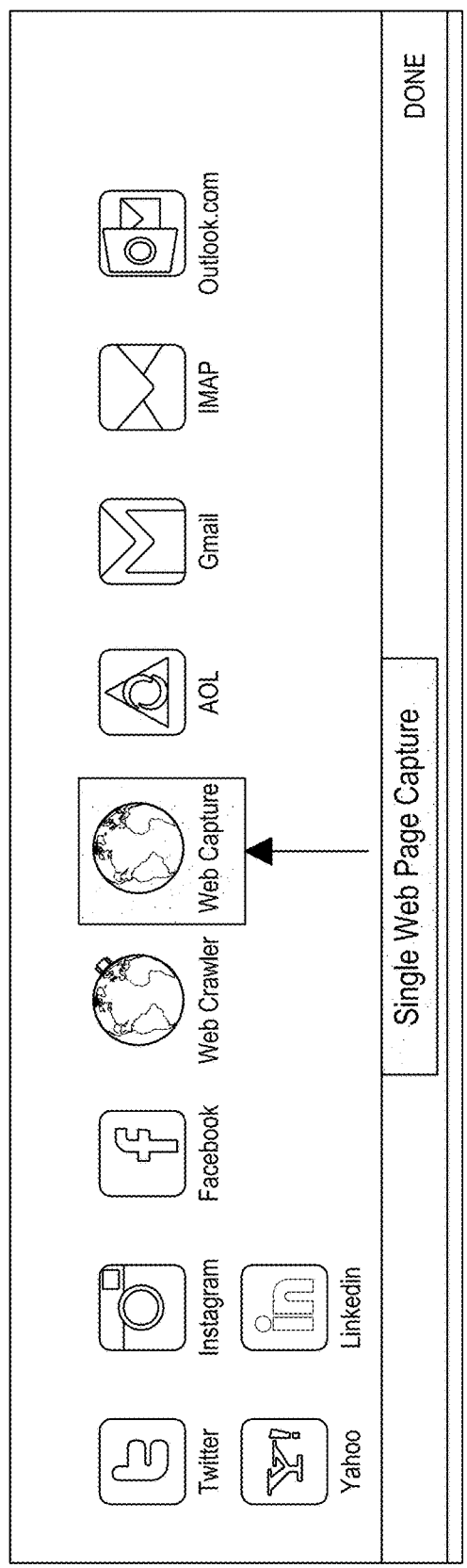
Figure 3C:
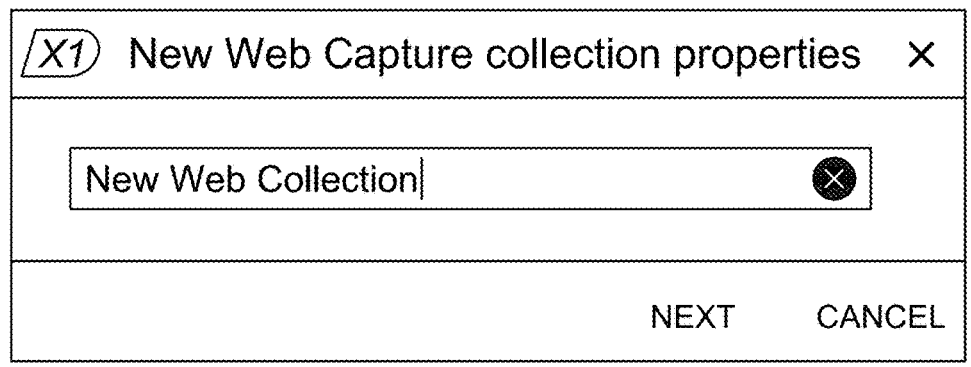
Figure 3D:
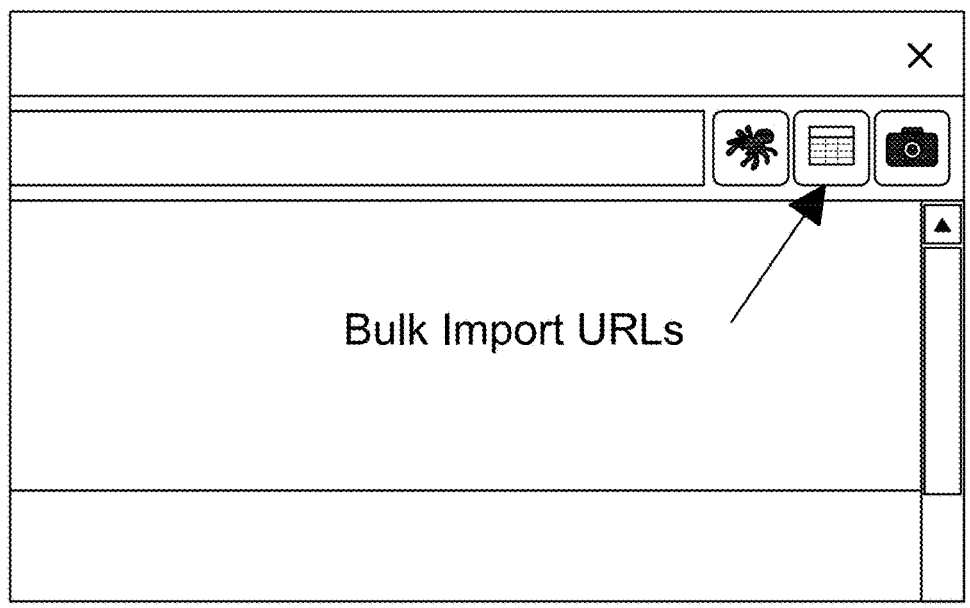

If the user activates a "next" control the example user interface illustrated in FIG. 3D may be presented including a control via which the user may instruct the system to perform a bulk import of URLs. The user interface illustrated in FIG. 3E is then presented and includes a field via which the user can enter one or more locators (e.g., URLs) or a control via which the user can specify a location of a file of URLs which may be imported into the CA system for use in accessing the content to be added to the collection. Optionally, the user may be able to add metadata to be stored in association with a given collection of content. For example, an interface may be provided via which the user can add text, video, or audio notes to a collection and/or a collection identifier. A collection initiation control may be provided via which the user can instruct the CA system to initiate the collection of content. If the user has finished adding items to the particular collection, the user may activate a "Done" control. Otherwise, the user may add additional items to the collection using one or more content collection techniques offered by the CA system, such as a single page web capture, web crawler capture, or bulk import capture.

The collection captured by the CA system will appear in the left-hand Navigation Pane of the user interface illustrated in FIG. 3A, under the Web Capture section. Selecting the appropriate collection name and the CA system will cause the web pages that have been captured for that collection to appear in the Results Pane.

Referring to FIG. 4, an example user interface may be provided via which a user can initiate a web crawl for content. For example, the web crawl functionality may be used to capture, preserve and index entire web sites or specific portions of web sites. The user interface of FIG. 4 may be accessed by selecting the web crawler control presented by the user interface illustrated in FIG. 3B. A field is provided via which the user can enter a start website URL address, which will be used as the primary (e.g., top-level) URL from which indexing will start. Optionally, if a user enters a sub-domain level the CA system will still start the indexing at the top level domain. For example, if the user enters the URL www.domain.com/support as the start URL, the CA system will begin the crawl from www.domain.com.

A layer user interface may be provided via which the user specify the number of layers the CA system is to crawl. A layer may include all of the links directly related to that page. For example, the user may set a limit as to how many layers down, from the top-level domain (or optionally from a specified sub-domain level), the CA system will crawl and index content. Optionally, there may be a maximum number of layers the system will permit the user to specify and will provide an error message to the user if the CA system detects that the user has specified an amount greater than the maximum number of levels.

A layer user interface may be provided via which the user specify the maximum number of pages to crawl and index (e.g., to prevent information overload).

A URL filter user interface may be provided via which the user can instruct the CA system to collect only URLs that start with or contain the user specified text entered into the URL filter field. The filter enables the CA system to filter for a particular directory or word that is contained in the URL. An "include subdomains" control is optionally provided via which the user can indicate whether subdomains are to be included in the crawl. A sub domain is a domain which part of a larger domain and has a different start to the URL address. By way of illustrative example, a subdomain for a "largerdomain.com" may be "subdomain.largerdomain.com." Thus, in response to a default setting or in response to a user specification, only content that is within a specified top level domain will be indexed, and, via the "include subdomains" control, the user can indicate that content within a specified top level domain is to be indexed and that links should be followed and pages on subdomains are to be indexed.

An optional user interface is provided via which the user can specify one or more of the following example options. A Page Download Timeout field is provided via which the user can change the download timeout time (where the CA system will stop trying to collect a page if there is no response by the time the download timeout occurs). Timing out a page capture is helpful when a crawl has pages which are taking an excessive time to load and are failing as a result. A "Generate .PNG image for web pages" control is provided via which the user can instruct the CA system to create a PNG (or other visual image file) of the page to capture the appearance of the page as it would appear when viewed directly on the respective website. The use of a page image capture addresses the problem posed by certain dynamic and scripted pages that do not capture properly when viewing the HTML.

A "Download Videos" control is optionally provided via which the user can instruct the CA system to download videos when capturing pages including embedded or linked-to video content. A "Download File URLs" control is optionally provided via which the user can instruct the CA system to download file pages (e.g. PDF's) when capturing URLs that reference a binary, non-HTML filetype, like a PDF, DOC, PPT, or XLS. By way of example, a URL such as:

"http://www.x1.com/download/X1_Social_Discovery_Product_Brief.pdf."

Optionally, a user interface is provided via which the user can set a maximum file size which the CA system is to capture. Optionally, a "Use White List" control is provided via which the user can instruct the CA system only collect the types of files specified by the user (e.g., via a white list of file types). Optionally, a scheduling interface is provided via which the user can specify how often a website is to be crawled (e.g., once a day, every third day, once an hour, once every five hours, once a week, every thirty minutes, etc.).

Optionally, the CA system provides a substantially real time web crawl progress indication for display. For example, the CA system may determine and display a list of found pages and will display while HTML files will be queued for download. As each queued page is downloaded, the download status will be display (e.g., an indication as to whether or not the download was successful).

Optionally, a user interface is provided via which the user can specify that browser cookie sessions are (or are not) to be used when crawling a website. The use of session cookies enables credentialed sites to be crawled and captured.

Crawl logs may be automatically generated by the CA system and may be provided for display to the user (e.g., in response to the user selecting an open log control on the web crawl's configuration user interface).

Figure 5A:
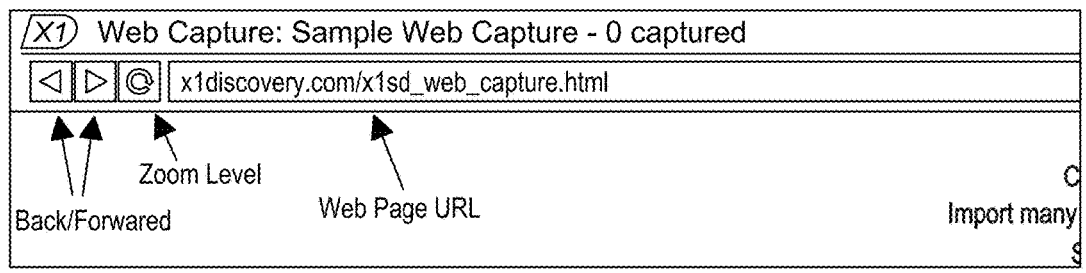

Referring to FIG. 5A, an example user interface may be provided via which a user can initiate a single web page capture for content collection. The single web page capture technique enables the user to manually cause the CA system to navigate to and capture web pages using the CA system's internal browser (which may optionally be equipped with a URL address field, a backward/forward navigation controls, a zoom level control, a refresh control, a crawl site control, a bulk import control, a snapshot control, etc.). For example, the user can specify a URL to which the browser is to navigate to and capture. The CA system may enable the captured web page may be viewed, searched, tagged, and exported.

Figure 5B:
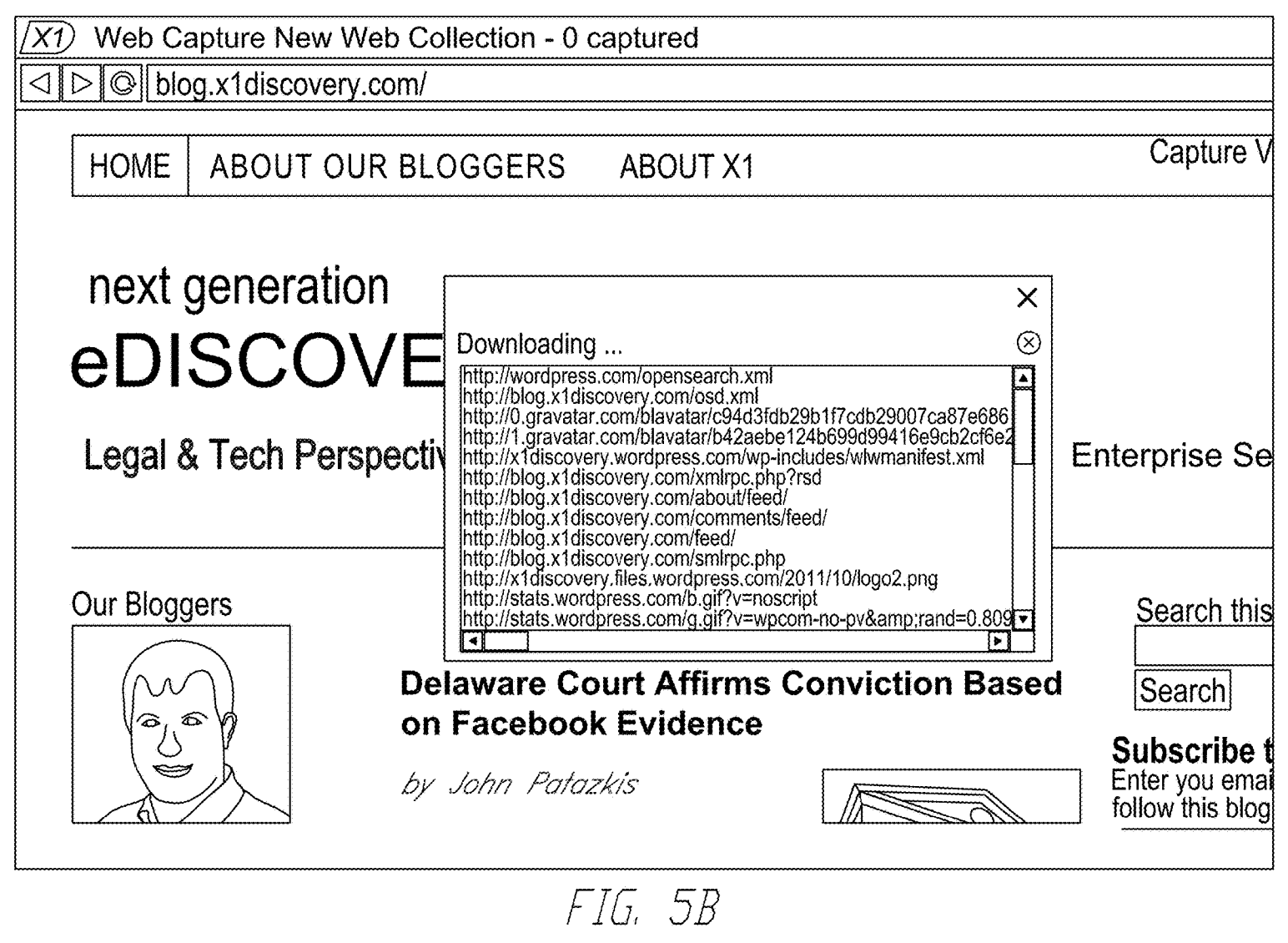

The user interface of FIG. 5A may be accessed by selecting the web capture control presented by the user interface illustrated in FIG. 3B. The CA system may be configured to receive a user-specified name for the collection via New Web Capture collection properties user interface field. A collection may include one or more web page captures. The user may enter a URL into the address field, the browser will then navigate to the specified URL and display the web page, and in response to the user activating the snapshot control, the browser (and hence the CA system) will capture the web page. In response to the user activating the snapshot control, the browser may present a user interface including a collection identifier field and a notes field via which the user can enter a collection identifier and collection notes. The CA system may store the identifier and notes, and index the captured web page, and optionally the identifier and notes. The stored and indexed information may be searched by the user or the system. As the page is downloading, a user interface, such as that illustrated in FIG. 5B, may display listing the files and components being downloaded and collected. The system may also keep track of the number of records captured, and display the number of records captured via the user interface.

Figure 5C:
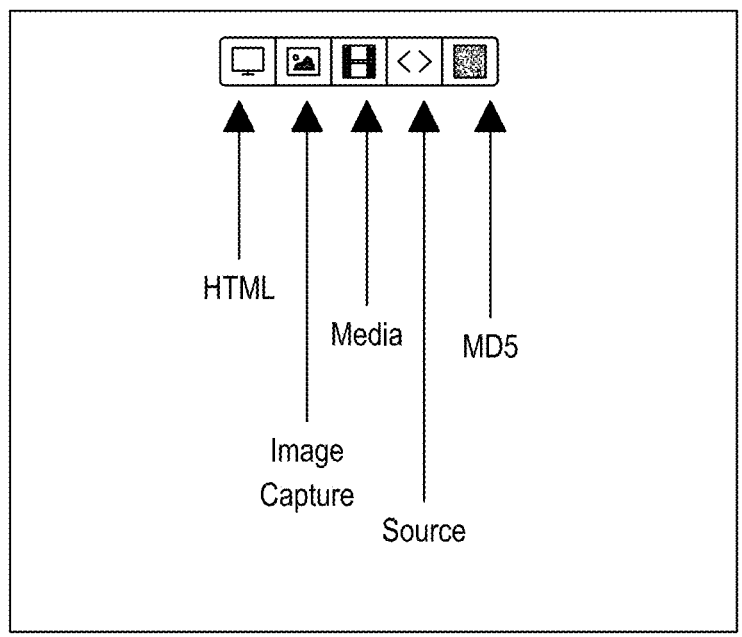

Optionally, the CA system may capture and display the web page HTML, image, source code and/or the MD5 hash value calculated for the web page. A control, such as that illustrated in FIG. 5C, may be provided via which the user can specify whether the web page HTML, image, source code and/or MD5 hash value are to be displayed and may enable the user to toggle through the different formats.

Optionally, controls are provided via which a user can add to an existing web capture collection or delete an existing web capture collection. For example, the user may select a given collection, provide a URL to which the CA system browser is to navigate, activate the snapshot control, which will cause the CA system to capture the page and add it to the selected collection.

Figure 6:
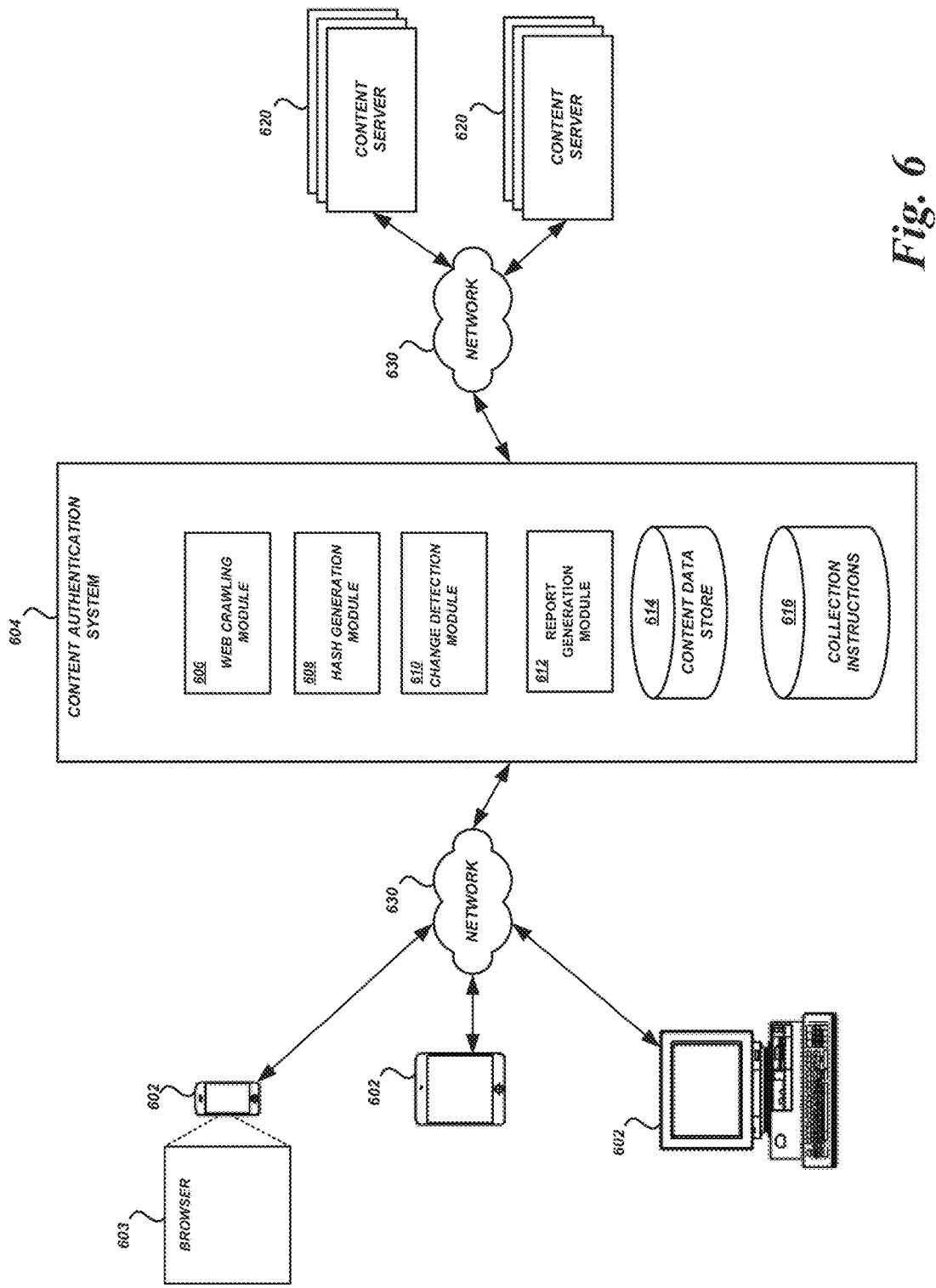
FIG. 6 illustrates an example environment.

FIG. 6 illustrates an example environment. An example content authentication (CA) system 604 may be utilized to perform some or all of the processes disclosed herein. For example, the CA system 604 may include a web crawling module 606 configured to browse locations hosted by one or more content servers 620. The content servers 620 may host websites and associated content which are the subject of a discovery directive. The web crawling module 606 may perform indexing on the content, as similarly described elsewhere herein. The crawled content may be collected, copied, and stored in the CA system content data store 614. The target, timing and depth of a crawling and indexing process may be performed in accordance with user collection instructions stored in, and accessed from, collection instructions data store 616. The collection instructions may have been provided via a user terminal 602 (e.g., a desktop computer, a laptop computer, a tablet computer, a smart phone, etc.). The user interface for providing such collection instructions may be provided to a user terminal browser 603.

A hash generation module 608 may generate hash values for the content, which may include one or more webpages or other documents. For example, the hash generation module 608 may generate: hash values for files composing a document; dedicated hash values corresponding to HTML files used to compose the document; and/or aggregated hash values, as similarly discussed elsewhere herein. The hash values may optionally be stored in content data store 614 in association with the content.

An optional change detection module 610 detects changes in hash values for a given document calculated for versions of the document accessed at different times, where a change in a hash value may indicate corresponding changes in the associated file(s). For example, changes may be detected in the files composing a document, the dedicated hash values corresponding to HTML files used to compose the document, and/or the aggregated hash values. A report generation module 612 may be used to generate a report of the hash values for a given document, associated files, and associated HTML files, as well as report associated aggregated hash values. Changes in hash values may be indicated via text, highlighting, icons, sorting, and/or otherwise. The report may include a table, as similarly discussed elsewhere herein. The report generation module 612 may optionally sort the table alphabetically using a storage path as the sort order. The report may be provided to the user terminals 602, optionally via a webpage displayed by the user terminal browsers 603. The various systems and modules illustrated in FIG. 6 may be interconnected and communicate via a network 630, such as the Internet or other local or wide area network.

While the foregoing example references web pages, the processes and systems described herein can be applied to other documents including links to other content or having embedded content, such as an XML feed. By way of illustration, a dynamic document may be in the form of an email that includes links to images. By way of yet further illustration, a dynamic document may be in the form of a word processing document including a table that is dynamically populated using a data feed from a remote resource.

Thus, methods and systems are described for accurately identifying dynamic content, such as web pages, other documents including links to other content or having embedded content, and the like.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc. While reference may be made to displaying or storing data in a row or column, other display formats and organizations or data storage structures may be used.

The results of the disclosed methods may be stored in any type of computer data repository, such as relational databases and flat file systems that use volatile and/or non-volatile memory (e.g., magnetic disk storage, optical storage, EEPROM and/or solid state RAM).

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. They may optionally include displays, user input devices (e.g., touchscreen, keyboard, mouse, voice recognition, etc.), network interfaces, etc.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the invention can be practiced in many ways. As is also stated above, the use of particular terminology when describing certain features or aspects of certain embodiments should not be taken to imply that the terminology is being re-defined herein to be restricted to including any specific characteristics of the features or aspects of the invention with which that terminology is associated.

What is claimed is:

1. A method of enabling changes in website content to be detected, the method comprising:
   receiving an address;
   accessing at a first time period, by a computerized system comprising at least one computing device, a web page corresponding to the address;
   identifying, by the system, HTML web page text of the web page accessed at the first time period;
   identifying, by the system, items of content linked to by the web page accessed at the first time period;
   storing the identified HTML web page text accessed at the first time period;
   accessing and storing the items of content linked to by the web page accessed at the first time period;
   calculating, by the system, a first hash value corresponding to the identified HTML web page text accessed at the first time period, wherein calculating the first hash value does not include in the calculation of the first hash value the items of content linked to by the web page accessed at the first time period;
   calculating a first set of hash values for respective items of content linked to by the web page accessed at the first time period;

calculating a first aggregated hash value based on the first hash value and the first set of hash values for respective items of content linked to by the web page accessed at the first time period;

storing the first hash value, the first set of hash values, and the first aggregated hash value in association with a date and time corresponding to the first time period and in association with a first identifier;

accessing, at a second time period, the web page corresponding to the address;

identifying, by the system, HTML web page text of the web page accessed at the second time period;

identifying, by the system, items of content linked to by the web page accessed at the second time period;

storing the identified HTML web page text accessed at the second time period;

accessing and storing the items of content linked to by the web page accessed at the second time period;

calculating, by the system, a second hash value corresponding to the identified HTML web page text accessed at the second time period;

calculating a second set of hash values for respective items of content linked to by the web page accessed at the second time period;

calculating a second aggregated hash value based on the second hash value and the second set of hash values for respective items of content linked to by the web page accessed at the second time period;

storing the second hash value, the second set of hash values, and the second aggregated hash value in association with a date and time corresponding to the second time period;

using the first hash value, corresponding to the identified HTML web page text accessed at the first time period, and the second hash value, corresponding to the identified HTML web page text accessed at the second time period, detecting whether the webpage HTML text has changed, and if the webpage HTML text has changed, and providing a first visual indication indicating changes in the webpage HTML text;

using the first set of hash values for respective items of content linked to by the web page accessed at the first time period, and the second set of hash values for respective items of content linked to by the web page accessed at the second time period, detecting if the respective items of content linked to by the web page have changed and providing a second visual indication indicating changes in the content linked to by the web page and indicating which content linked to by the web page has changed;

using the first aggregated hash value, calculated based on the first hash value and the first set of hash values for respective items of content linked to by the web page accessed at the first time period, the second aggregated hash value, calculated based on the second hash value and the second set of hash values for respective items of content linked to by the web page accessed at the second time period, to detect whether the webpage or respective items of content linked to by the web page have changed, and providing a corresponding third visual indication.

2. The method a defined in claim 1, wherein the items of content linked to by the web page at the first time period comprises first image content, and the items of content linked to by the web page at the second time period comprises second image content different than the first image content, and the link to the first image content is the same as the link to the second image content.

3. The method as defined in claim 1, the method further comprising:
providing a user interface configured to receive from a user:
a locator, and
a depth specification;
receiving a first locator provided by the user via the user interface;
receiving a first depth specification provided by the user via the user interface;
accessing, at a third time period, a first item of content corresponding to the first locator;
accessing, at the third time period, hyperlinked items of content from multiple layers of content in accordance with the first depth specification;
calculating respective hash values for each layer of content accessed during the third time period;
accessing, at a fourth time period, the first item of content corresponding to the first locator;
accessing, at the fourth time period, hyperlinked items of content from multiple layers of content in accordance with the first depth specification;
calculating respective hash values for each layer of content accessed during the fourth time period;
enabling the user to detect changes in layer content based at least in part on the calculated respective hash values for each layer of content accessed during the fourth time period.

4. The method as defined in claim 1, wherein calculating the first hash value further comprises calculating an MD5 hash value.

5. The method as defined in claim 1, the method further comprising:
providing a user interface configured to receive an indication as to whether:
video files embedded in or linked to by a given web page being collected are to be collected;
a visual image of the given web page is to be generated;
receiving at the system an indication from the user via the user interface indicating whether the video files embedded in or linked to a given web page being collected are to be collected and whether a visual image of the given web page is to be generated;
at least partly in response to the indication from the user, determining whether to collect video files embedded in or linked to the given web page being collected;
at least partly in response to the indication from the user, determining whether to generate a visual image of the given web page.

6. The method as defined in claim 1, wherein providing the first visual indication, the second visual indication and the third visual indication further comprises generating a user interface including:
the address;
the first hash value, the first set of hash values, and the first time period;
the second hash value, the second set of hash values, and the second time period.

7. The method as defined in claim 1, wherein the calculated first aggregated hash value includes a value calculated based upon text between a <body> and a </body> tag.

8. The method as defined in claim 1, wherein the address is a URL, and the calculation of the first hash value does not include the URL in the calculation of the first hash value.

9. The method as defined in claim 1, the method further comprising enabling a user to specify for which file types a dedicated hash is to be calculated by the system.

10. A method comprising:
receiving an address for a document;
identifying, by a computer system comprising at least one computing device, files composing the document, including files linked to by the document, at a first time period;
calculating, by the computer system, a first set of hash values including respective hash values corresponding to the respective accessed files composing the document at the first time period, the first set of hash values including hash values for respective files linked to by the document accessed at the first time period;
determining, by the computer system, if a file in the identified files composing the document at the first time period is an HTML file;
at least partly in response to determining that a file in the identified files composing the document at the first time period is an HTML file, calculating, by the computer system, a first additional hash value corresponding to the HTML file, wherein calculating the first additional hash value does not include in the calculation of the first additional hash value files linked to by the document accessed at the first time period;
calculating, by the computer system, a first aggregated hash value based on hash values in the first set of hash values and on the first additional hash value;
identifying, by the computer system, files composing the document, including files linked to by the document, at a second time period;
calculating, by the computer system, a second set of hash values including respective hash values corresponding to the respective accessed files composing the document at the second time period, wherein calculating the second additional hash value does not include in the calculation of the second additional hash value files linked to by the document accessed at the second time period;
determining, by the computer system, if a file in the identified files composing the document at the second time period is an HTML file;
at least partly in response to determining that a file in the identified files composing the document at the second time period is an HTML file, calculating, by the computer system, a second additional hash value corresponding to the HTML file, wherein the second additional hash value does not include hash values for respective files linked to by the document accessed at the second time period;
calculating, by the computer system, a second aggregated hash value based on hash values in the second set of hash values and on the second additional hash value;
using the first additional hash value, corresponding to the HTML file composing the document at the first time period, and the second additional hash value, corresponding to the HTML file composing the document at the second time period, detecting whether HTML file has changed, and if the HTML file has changed, providing a first visual indication indicating that the HTML file has changed;
using the first set of hash values, including respective hash values corresponding to the respective accessed files composing the document, including files linked to by the document, at the first time period, and the second set of hash values, including respective hash values corresponding to the respective accessed files composing the document, including files linked to by the document, at the second time period, detecting if the respective accessed files composing the document have changed, and if the respective accessed files composing the document have changed, providing a corresponding second visual indication indicating which accessed files composing the document have changed; and
using the first aggregated hash value, calculated based on hash values in the first set of hash values, the first set of hash values including hash values for respective files linked to by the document accessed at the first time period, and on the first additional hash value, and the second aggregated hash value, calculated based on hash values in the second set of hash values, the second set of hash values including hash values for respective files linked to by the document accessed at the second time period, and on the second additional hash value, to detect whether the document or files composing the document have changed, and providing a corresponding third visual indication.

11. The method as defined in claim 10, wherein the files composing the document comprise linked to files.

12. The method as defined in claim 10, wherein the document comprises a web page.

13. The method as defined in claim 10, wherein the document comprises a microblog page.

14. The method as defined in claim 10, the method further comprising:
providing a user interface configured to receive from a user:
a locator, and
a depth specification;
receiving a first locator provided by the user via the user interface;
receiving a first depth specification provided by the user via the user interface;
accessing, at a third time period, a first item of content corresponding to the first locator;
accessing, at the third time period, hyperlinked items of content from multiple layers of content in accordance with the first depth specification;
calculating respective hash values for each layer of content accessed during the third time period;
accessing, at a fourth time period, the first item of content corresponding to the first locator;
accessing, at the fourth time period, hyperlinked items of content from multiple layers of content in accordance with the first depth specification;
calculating respective hash values for each layer of content accessed during the fourth time period;
enabling the user to detect changes in layer content based at least in part on the calculated respective hash values for each layer of content accessed during the fourth time period.

15. The method a defined in claim 10, wherein the document at the first time period includes a first link, wherein the first link links to a first image file, and the document at the second time period includes the first link, wherein the first link links to a second image file and not the first image file.

16. The method as defined in claim 10, the method further comprising:
providing a user interface configured to receive an indication as to whether:
video files embedded in or linked to a given document being collected are to be collected;

a visual image of the given document is to be generated;
receiving at the system an indication from the user via the user interface indicating whether the video files embedded in or linked to a given document being collected are to be collected and whether a visual image of the given document is to be generated;
at least partly in response to the indication, determining whether to collect video files embedded in or linked to a given document being collected;
at least partly in response to the indication, determining whether to generate a visual image of the given document.

17. A system, comprising:
a computing system comprising at least one computing device;
a non-transitory computer storage medium having stored thereon executable instructions that direct the computing system to perform operations comprising:
receiving an address for a document;
identifying, files composing the document, including files linked to by the document, at a first time period;
calculating, by the computer system, a first set of hash values including respective hash values corresponding to the respective accessed files composing the document at the first time period, the first set of hash values including hash values for respective files linked to by the document accessed at the first time period;
determining, by the computer system, if a file in the identified files composing the document at the first time period is an HTML file;
at least partly in response to determining that a file in the identified files composing the document at the first time period is an HTML file, calculating, by the computer system, a first additional hash value corresponding to the HTML file, wherein calculating the first additional hash value does not include in the calculation of the first additional hash value files linked to by the document accessed at the first time period;
calculating, by the computer system, a first aggregated hash value based on hash values in the first set of hash values and on the first additional hash value;
identifying, by the computer system, files composing the document, including files linked to by the document, at a second time period;
calculating, by the computer system, a second set of hash values including respective hash values corresponding to the respective accessed files composing the document at the second time period, the second set of hash values including hash values for respective files linked to by the document accessed at the second time period;
determining, by the computer system, if a file in the identified files composing the document at the second time period is an HTML file;
at least partly in response to determining that a file in the identified files composing the document at the second time period is an HTML file, calculating, by the computer system, a second additional hash value corresponding to the HTML file, wherein calculating the second additional hash value does not include in the calculation of the second additional hash value files linked to by the document accessed at the second time period;
calculating, by the computer system, a second aggregated hash value based on hash values in the second set of hash values and on the second additional hash value;
using the first additional hash value, corresponding to the HTML file composing the document at the first time period, and the second additional hash value, corresponding to the HTML file composing the document at the second time period, detecting whether the HTML file has changed, and if the HTML file has changed, providing a first visual indication indicating that a change to the HTML file has occurred;
using the first set of hash values, including respective hash values corresponding to the respective accessed files composing the document, including files linked to by the document, at the first time period, and the second set of hash values, including respective hash values corresponding to the respective accessed files composing the document, including files linked to by the document, at the second time period, detecting if the respective accessed files composing the document have changed, and if the respective accessed files composing the document have changed, providing a corresponding second visual indication indicating which accessed files composing the document have changed; and
using the first aggregated hash value, calculated based on hash values in the first set of hash values, the first set of hash values including hash values for respective files linked to by the document accessed at the first time period, and on the first additional hash value, and the second aggregated hash value, calculated based on hash values in the second set of hash values, the second set of hash values including hash values for respective files linked to by the document accessed at the second time period, and on the second additional hash value, to detect whether the document or files composing the document have changed, and providing a corresponding third visual indication.

18. The system as defined in claim 17, wherein the files composing the document comprise linked to files.

19. The system as defined in claim 17, wherein the document comprises a web page.

20. The system as defined in claim 17, wherein the document comprises a microblog page.

21. The system as defined in claim 17, the operations further comprising:
providing a user interface configured to receive from a user:
a locator, and
a depth specification;
receiving a first locator provided by the user via the user interface;
receiving a first depth specification provided by the user via the user interface;
accessing, at a third time period, a first item of content corresponding to the first locator;
accessing, at the third time period, hyperlinked items of content from multiple layers of content in accordance with the first depth specification;
calculating respective hash values for each layer of content accessed during the third time period;
accessing, at a fourth time period, the first item of content corresponding to the first locator;
accessing, at the fourth time period, hyperlinked items of content from multiple layers of content in accordance with the first depth specification;
calculating respective hash values for each layer of content accessed during the fourth time period;
enabling the user to detect changes in layer content based at least in part on the calculated respective hash values for each layer of content accessed during the fourth time period.

22. The system as defined in claim 17, wherein the document at the first time period includes a first link, wherein the first link links to a first image file, and the document at the second time period includes the first link, wherein the first link links to a second image file and not the first image file.

23. The system as defined in claim 17, the operations further comprising:
provide a user interface configured to receive an indication as to whether: video files embedded in or linked to a given document being collected are to be collected;
a visual image of the given document is to be generated;
receiving at the system an indication from the user via the user interface indicating whether the video files embedded in or linked to a given document being collected are to be collected and whether a visual image of the given document is to be generated;
at least partly in response to the indication, determining whether to collect video files embedded in or linked to a given document being collected;
at least partly in response to the indication, determining whether to generate a visual image of the given document.

24. A method comprising:
receiving an address for a document;
identifying, by a computer system comprising at least one computing device, files composing the document, including files linked to by the document, at a first time period;
calculating, by the computer system, a first hash value based at least on text present in the document at the first time period, wherein calculating the first hash value does not include in the calculation of the first hash value files linked to by the document accessed at the first time period;
calculating, by the computer system, a first set of hash values including respective hash values corresponding to the respective accessed files composing the document at the first time period, the first set of hash values including hash values for respective files linked to by the document accessed at the first time period;
calculating, by the computer system, a first aggregated hash value based on hash values in the first set of hash values and the first hash value;
calculating, by the computer system, a second hash value based at least on text present in the document at a second time period, wherein calculating the second hash value does not include in the calculation of the second hash value files linked to by the document accessed at the second time period;
calculating, by the computer system, a second set of hash values including respective hash values corresponding to the respective accessed files composing the document at the second time period, the second set of hash values including hash values for respective files linked to by the document accessed at the second time period;
calculating, by the computer system, a second aggregated hash value based on hash values in the second set of hash values and the second hash value;
using the first hash value, based at least on text present in the document at the first time period, and the second hash value, based at least on text present in the document at a second time period, detecting whether document text has changed, and if the document text has changed, providing a first visual indication indicating that a change to the document text has occurred;
using the first set of hash values, including respective hash values corresponding to the respective accessed files composing the document, including files linked to by the document, at the first time period, and the second set of hash values, including respective hash values corresponding to the respective accessed files composing the document, including files linked to by the document, at the second time period, detecting if the respective accessed files composing the document have changed, and if the respective accessed files composing the document have changed, providing a corresponding second visual indication indicating which accessed files composing the document have changed; and
using the first aggregated hash value, calculated based on hash values in the first set of hash values and the first hash value, the first set of hash values including hash values for respective files linked to by the document accessed at the first time period, and the second aggregated hash value, calculated second aggregated hash value based on hash values in the second set of hash values, the second set of hash values including hash values for respective files linked to by the document accessed at the second time period, and the second hash value, to detect whether the document or files composing the document have changed, and providing a corresponding third visual indication.

25. The method as defined in claim 24, wherein the first set of hash values comprises one or more content hashes, corresponding to one or more HTML portions of respective accessed files composing the document, and one or more acquisition hashes, corresponding to one or more non-HTML portions of the document at the first time period.

* * * * *

UNITED STATES PATENT AND TRADEMARK OFFICE
CERTIFICATE OF CORRECTION

PATENT NO. : 9,880,983 B2  
APPLICATION NO. : 14/293600  
DATED : January 30, 2018  
INVENTOR(S) : Brent Botta It is certified that error appears in the above-identified patent and that said Letters Patent is hereby corrected as shown below:

In the Specification

Column 9 Line 17, Change "that that" to --that--.

In the Claims

Column 15 Line 63, Claim 2, change "a" to --as--.

Column 18 Line 56, Claim 15, change "a" to --as--.

Signed and Sealed this
Eighth Day of May, 2018

Andrei Iancu
*Director of the United States Patent and Trademark Office*